United States Patent [19]

Smith et al.

[11] 4,437,952

[45] Mar. 20, 1984

[54] COEXTRUDED MULTILAYER CATION EXCHANGE MEMBRANES

[75] Inventors: Roger A. Smith, Kennett Square; Michael S. Withers, Landenberg, both of Pa.

[73] Assignee: E. I. Du Pont de Nemours & Co., Wilmington, Del.

[21] Appl. No.: 436,422

[22] Filed: Oct. 25, 1982

Related U.S. Application Data

[63] Continuation-in-part of Ser. No. 336,849, Jan. 4, 1982, abandoned, which is a continuation-in-part of Ser. No. 298,600, Sep. 2, 1981, abandoned, which is a continuation of Ser. No. 225,653, Jan. 16, 1981, abandoned.

[51] Int. Cl.$^3$ .................. C25B 1/34; C25B 13/02
[52] U.S. Cl. ................................. 204/98; 204/128; 204/252; 204/296; 204/283; 264/171
[58] Field of Search ............... 204/98, 128, 296, 283, 204/252; 264/176 R, 171

[56] References Cited

U.S. PATENT DOCUMENTS

| | | | |
|---|---|---|---|
| 3,993,810 | 11/1976 | Bonis | 428/35 |
| 4,030,988 | 6/1977 | Grot | 204/98 |
| 4,094,947 | 6/1978 | Alfrey, Jr. et al. | 264/171 |
| 4,153,530 | 5/1979 | Vallance et al. | 204/252 |
| 4,165,248 | 8/1979 | Darlington et al. | 156/308 |
| 4,169,203 | 9/1979 | Sata et al. | 204/98 |
| 4,170,540 | 10/1979 | Lazarz et al. | 204/296 |
| 4,176,215 | 11/1979 | Molnar et al. | 521/27 |
| 4,209,367 | 6/1980 | Seko et al. | 204/98 |
| 4,224,121 | 9/1980 | Dempsey et al. | 204/98 |
| 4,255,240 | 3/1981 | Molnar et al. | 204/98 |
| 4,332,665 | 6/1982 | Kimoto et al. | 204/296 |
| 4,349,422 | 9/1982 | Maloney | 204/98 |

FOREIGN PATENT DOCUMENTS 52-36589 6/1977 Japan .

OTHER PUBLICATIONS

"Coextruded Composite Film", Modern Plastics Encyclopedia, 1973–1974, pp. 156–165.

*Primary Examiner*—John F. Niebling

[57] ABSTRACT

Multilayer fluorinated cation exchange membranes prepared by coextrusion of precursor polymers.

23 Claims, No Drawings

COEXTRUDED MULTILAYER CATION EXCHANGE MEMBRANES

CROSS-REFERENCES TO RELATED APPLICATIONS

This is a continuation-in-part of U.S. Pat. application Ser. No. 336,849, filed Jan. 4, 1982, now abandoned, which is a continuation-in-part of U.S. Pat. application Ser. No. 298,600, filed Sept. 2, 1981, now abandoned, which is a continuation of U.S. Pat. application Ser. No. 225,653, filed Jan. 16, 1981 now abandoned.

BACKGROUND OF THE INVENTION

Fluorinated polymers containing pendant side chains are often used to prepare ion exchange membranes. Such membranes have outstanding properties as barrier membranes to separate the anode and cathode compartments of electrolytic cells used for the production of chlorine and caustic.

Fluorinated polymers containing carboxyl side chains provide excellent current efficiency in such electrolytic cells, but result in high operating voltages. By contrast, fluorinated polymers containing sulfonyl groups in the side chains permit operation at low voltages, but result in poor current efficiency in the electrolytic cell.

It has previously been recognized that combinations of polymers having sulfonyl and carboxyl groups or combinations of polymers having different equivalent weights are desirable to provide an optimum balance of performance characteristics in an electrolytic cell using membranes prepared from such polymers. Under normal cell operation, the water permeation characteristics of the layers are sufficiently close that the layers remain in intimate contact with each other. However, abnormal cell conditions, such as loss of electrical power, failure of water feed to the cathode chamber and particularly interruption or loss of brine feed to the cell, can produce a large difference in water transport. For example, if the anolyte is depleted below 50 g/l NaCl, a large quantity of water will be transported through a fluorinated polymer having a sulfonyl side chains. However, the water is substantially less able to permeate a polymer having carboxyl-containing side chains. Thus, during an upset of cell operation, a composite of two such polymers may experience a buildup of water at the interface, resulting in delamination of the composite.

SUMMARY OF THE INVENTION

The instant invention provides composite cation exchange membranes exhibiting improved resistance to delamination in an electrolytic cell and a process for the production of such composite membranes by coextrusion.

Specifically, the instant invention provides a process for the preparation of a multilayer cation exchange membrane by heating at least two substantially incompatible melt-fabricable fluorinated polymers having pendant side chains containing functional groups selected from sulfonyl and carboxyl to a temperature above the melting point of the polymers, bringing the molten polymers into contact while each is at a temperature above the melting point of the polymer, coextruding the polymers into a composite film, cooling the resulting composite to a temperature below the melting points of each of the films, and subsequently converting the functional groups to ionizable functional groups.

DETAILED DESCRIPTION OF THE INVENTION

The melt-fabricable polymers used in the instant invention are of the types generally used previously in the preparation of films or reinforced laminates for use in electrochemical cells, and especially chloralkali cells. These include fluorinated polymers with pendant side chains containing sulfonyl groups, carboxyl groups, or both.

The melt-fabricable polymer having sulfonyl functional groups has a fluorinated hydrocarbon backbone chain to which are attached functional groups or pendant side chains bearing the functional groups. The pendant side chains can contain, for example,

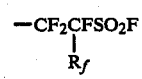

groups wherein $R_f$ is F, Cl, or a $C_1$ to $C_{10}$ perfluoralkyl radical. Fluorinated polymers of this type and their preparation are described in detail in U.S. Pat. Nos. 3,282,875, 3,560,568, 3,718,627, and 3,041,317, all of which are hereby incorporated by reference. For chloralkali cells, perfluorinated polymers are preferred.

The melt-fabricable polymer having carboxylic functional groups has a fluorinated hydrocarbon backbone chain to which are attached the functional groups or pendant side chains which in turn carry the functional groups. The pendant side chains can contain, for example,

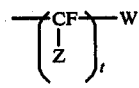

groups wherein Z is F or $CF_3$, t is 1 to 12 and preferably 1 to 3, and W is —COOR or —CN, wherein R is lower alkyl. Preferably, the functional group in the side chains of the polymer will be present in terminal

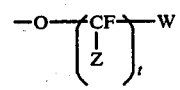

groups. Such fluorinated polymers containing carboxylic functional groups and their preparation are disclosed in British Patent No. 1,145,445 and U.S. Pat. Nos. 3,506,635 and 4,116,888, all hereby incorporated by reference. Preferred monomers for use in the preparation of such polymers are found in U.S. Pat. Nos. 4,131,740 and 3,852,326, also hereby incorporated by reference. For chlor-alkali cells, perfluorinated polymers are preferred.

The particular polymers used in the present invention are substantially incompatible. Substantially incompatible polymers are those which, after blending above the melting point of each polymer, separate into distinct phases on cooling to room temperature. Thus, the polymers used to form the component layers in the present invention can include one membrane having carboxylic functional groups and another membrane having sulfonyl functional groups. Alternatively, two polymers having similar chemical composition, for example, both polymers being characterized by sulfonyl groups, but substantially incompatible due to variation in equivalent weight, can also be used in accordance with the present invention.

In general, polymers used in the present invention having sulfonyl groups exhibit an equivalent weight of about from 700 to 1600, and preferably about from 1000 to 1200. In the event that two fluorinated polymers having sulfonyl functional groups are used, the equivalent weight of the polymers should differ by at least about 200 to realize the required degree of incompatibility.

In general, the polymers having carboxylic functional groups exhibit an equivalent weight of about from 700 to 1200, and preferably about from 1,050 to 1,150.

Each of the melt fabricable resins used should be uniform or well-blended. The carboxylate resin should be protected from atmospheric moisture prior to coextrusion to prevent hydrolysis.

In accordance with the present invention, the final product contains at least two layers, and preferably two or three layers. The total thickness of the final product of the present invention can be about from 25 to 250 microns. Particularly good balance of cell voltage and durability in a chloralkali cell is realized with a total thickness of 75 to 150 microns, and this composite thickness is accordingly preferred. Each component of a laminate of the present invention should comprise at least about 5% of the total thickness of a composite. In general, in a two component laminate prepared from polymers having carboxylic and sulfonic functional groups, respectively, the carboxyl containing polymer preferably comprises about from 15 to 33% of the total thickness of the composite.

The present laminar structures are prepared by coextruding the polymers above the melting point of each polymer. A wide variety of mechanical variations can be used, including commercially available coextrusion equipment such as that manufactured by Johnson Plastics Machinery Company of Chippewa Falls, Wis. For example, the laminates can be prepared using multiple extruders feeding into separate zones of a common chamber, following which the layered stream is fed to a single die. Another embodiment of the present invention involves the use of a single die known in the film processing industry as a "coat hanger" die. In the use of such a die, multiple extruders feed separate streams into the specialized die. The die expands the width of the streams and joins the two streams before they leave a single exit orifice of the die.

Within the requirement that the polymers be above the melting point, the particular processing temperature will depend on known operational requirements for extrusion of films. The temperature will be adjusted to obtain continuous smooth films of uniform caliper without die drips or other defects. Using the sulfonyl-containing and carboxyl-containing polymers of the present invention, an extrusion temperature range of about from 260° to 330° C. is preferred.

After coextrusion of the laminates, they are cooled to a temperature below the melting point of each polymer and treated according to known techniques to convert the functional groups to forms more suitable for use in electrolytic cell applications. Such conversion also renders the polymers substantially less melt-fabricable.

A reinforcing layer is generally also added to the composite structure. A wide variety of support materials can be used, including woven fabric or nonwoven material. In the case of woven fabric, weaves such as ordinary basket weave and leno weave can be used. The reinforcement threads can be either monofilament or multistranded.

Particularly preferred reinforcement materials are perhalocarbon polymer threads optionally in conjunction with sacrificial fibers which are dissolved by caustic or destroyed by oxidizing agents. As used herein, the term "perhalocarbon polymer" means a polymer which has a carbon chain optionally containing ether linkages and which is totally substituted by fluorine or by fluorine and chlorine atoms. Particularly preferred because of its inert character is a perfluorocarbon polymer. Typical of such polymers are those made from tetrafluoroethylene and copolymers of tetrafluoroethylene with hexafluoropropylene and/or perfluoro(alkyl vinyl ethers) wherein alkyl is from 1 to 10 carbon atoms. A preferred ether of this type is perfluoro(propyl vinyl ether).

The reinforcing material is conveniently applied to the sulfonyl-containing polymer in conjunction with another sulfonyl-containing polymer of the same equivalent weight. These two sulfonyl-containing polymers are then laminated, with the reinforcing material embedded in the composite layer of sulfonyl-containing polymer.

The laminar structures of the present invention are particularly useful as membranes in a wide variety of chloralkali electrolytic cells including, for example, monopolar and bipolar cells, plate-and-frame and finger cells, and in oxygen cathode cells. The membranes can also be used for converting diaphragm cells to membrane cells. In addition, these laminar structures can be used in zero-gap or narrow-gap cells, in which the gap between anode and cathode is no greater than about 3 mm and the laminar structure is in contact with at least one of the anode and cathode. Such arrangements minimize the resistance contributed by the anolyte and catholyte, thus providing for operation at low voltage. The membranes of this invention can also be used in a solid polymer electrolyte or composite electrode/membrane arrangement, in which a thin porous anode and/or porous cathode are attached directly to the membrane surface, and rigid or flexible current collectors can also be used in contact with these electrodes.

In any of the above arrangements, either or both of the electrodes can have a catalytically active surface layer of the type known in the art for lowering the overvoltage of an electrode. Such electrocatalyst can be of a type known in the art, such as those described in U.S. Pat. Nos. 4,224,121 and 3,134,697, and published UK Patent Application No. GB 2,009,788A. Preferred cathodic electrocatalysts include platinum black, Raney nickel and ruthenium black. Preferred anodic electrocatalysts include platinum black and mixed ruthenium and titanium oxides.

The membranes described herein can also be modified on either surface or both surfaces thereof so as to have enhanced gas release properties, for example by providing optimum surface roughness or smoothness by hot roll embossing or by embossing with a porous paper. When embossing with a porous paper, a release paper can be applied to an outer surface of the membrane prior to passing through a laminator used, for example, to apply a reinforcement for the membrane. Such surface embossing is further described in Maloney, U.S. Pat. No. 4,349,422, hereby incorporated by reference. Preferably the resulting surface roughness is about 2–5 microns (79–197 microinches) as measured, for example, on a Bendix Model 1020 profilometer.

Preferably, the gas release properties of the membranes are enhanced by providing thereon a gas- and liquid-permeable porous non-electrode layer. Such non-electrode layer can be in the form of a thin hydrophilic coating or spacer and is ordinarily of an inert electroinactive or non-electrocatalytic substance. Such non-electrode layer should have a porosity of 10 to 99%, preferably 30 to 70%, and an average pore diameter of 0.01 to 2000 microns, preferably 0.1 to 1000 microns, and a thickness generally in the range of 0.1 to 500 microns, preferably 1 to 300 microns. A non-electrode layer ordinarily comprises an inorganic component and a binder; the inorganic component can be an inorganic compound which is chemically stable in hot concentrated caustic and chlorine, and can be of a type as set forth in published UK Patent Application No. GB 2,064,586A, preferably tin oxide, titanium oxide, zirconium oxide, or an iron oxide such as $Fe_2O_3$ or $Fe_3O_4$. Other information regarding non-electrode layers on ion-exchange membranes is found in published European Patent Application No. 0,031,660, and in Japanese Laid-open Patent Applications Nos. 56-108888 and 56-112487. The particle size of the inorganic material can be about 1–100 microns, and preferably 1–10 microns.

The binder component in a non-electrode layer, and in an electrocatalyst composition layer, can be, for example, polytetrafluoroethylene, a fluorocarbon polymer at least the surface of which is hydrophilic by virtue of treatment with ionizing radiation in air or a modifying agent to introduce functional groups such as —COOH or —$SO_3H$ (as described in published UK Patent Application No. GB 2,060,703A) or treatment with an agent such as sodium in liquid ammonia, a functionally substituted fluorocarbon polymer or copolymer which has carboxylate or sulfonate functional groups, or polytetrafluoroethylene particles modified on their surfaces with fluorinated copolymer having acid type functional groups (No. GB 2,064,586A). Such binder can be used in an amount of about from 10 to 50% by wt. of the non-electrode layer or of the electrocatalyst composition layer. In addition to the inorganic component and the binder, the dispersion used to apply the inorganic component can include a thickener such as methyl cellulose or polyvinyl alcohol and a small amount of nonionic surfactant.

Composite structures having non-electrode layers and/or electrocatalyst composition layers thereon can be made by various techniques known in the art, which include preparation of a decal which is then pressed onto the membrane surface, spray application of a slurry in a liquid composition (e.g., dispersion or solution) of the binder followed by drying, screen or gravure printing of compositions in paste form, hot pressing of powders distributed on the membrane surface, and other methods as set forth in British Patent No. 2,064,586A or Japanese Laid-open patent application No. J57/89490. Such structures can be made by applying the indicated layers onto membranes in melt-fabricable form, and by some of the methods onto membranes in ion-exchange form; the polymeric component of the resulting structures when in melt-fabricable form can be hydrolyzed in known manner to the ion-exchange form.

Non-electrode layers and electrocatalyst composition layers can be used in combination in various ways on a membrane. For example, a surface of a membrane can be modified with a non-electrode layer, and an electrocatalyst composition layer disposed over the latter. It is also possible to place on a membrane a layer containing both an electrocatalyst and a conductive non-electrode material, e.g. a metal powder which has a higher overvoltage than the electrocatalyst, combined into a single layer with a binder. One preferred type of membrane is that which carries a cathodic electrocatalyst composition on one surface thereof, and a non-electrode layer on the opposite surface thereof.

Membranes which carry thereon one or more electrocatalyst layers, or one or more non-electrode layers, or combinations thereof, can be employed in an electrochemical cell in a narrow-gap or zero-gap configuration as described above.

In chloralkali electrolytic cells, the present membranes show outstanding resistance to damage or delamination, particularly in non-standard cell operating conditions. Moreover, the laminates show particular resistance to delamination or separation of the layers when the salt in the anolyte is depleted below 50 g/l. The present laminar structures also show increased storage life and permit the efficient preparation of laminates with a low frequency of defects.

The present invention is further illustrated in the following specific examples.

EXAMPLE 1

A two-component laminar structure was prepared using an apparatus consisting of three single barrel screw extruders, two of which were used in this preparation, coupled with heated transfer lines to a common chamber where the polymer streams met. The combined polymer stream was transferred from the common chamber through another heated transfer line to a six-inch slit die.

One extruder of this apparatus, having a one inch diameter barrel, was charged with cubes of a copolymer of tetrafluoroethylene (TFE) and methyl perfluoro(4,7-dioxa-5-methyl-8-noneate) (EVE) having an equivalent weight of 1,037 and melt flow of 25.5 at 270° C. The extruder was operated at 20 rpm with a barrel discharge temperature of 278° C.

The hopper to a second extruder, which had a 1¼" diameter barrel, was charged with cubes of a copolymer of tetrafluoroethylene (TFE) and perfluoro(3,6-dioxa-4-methyl-7-octenesulfonyl fluoride) (PSEPVE) having an equivalent weight of 1,090 and a melt flow of 31.4 at 250° C. This extruder was operated at 11 rpm with a barrel discharge temperature of 288° C. The common chamber and die temperatures were maintained at 277° C.

A coextruded two-layered film was produced at the rate of 2.5 cm/sec (5 ft/min). The total thickness of the coextruded film varied from 127 to 178 microns.

A piece of this film was hydrolyzed in a bath containing 30% dimethylsulfoxide (DMSO) and 11% potassium hydroxide for 20 minutes at 90° C. The film was rinsed and dried. Microtomed cross-sections were prepared across the width of the film, stained with Malachite green, and the relative thickness of the layers measured with a microscope.

The layer containing the carboxylic copolymer was continuous across the width of the extruded film and its thickness was 18% of the total.

A sample of the hydrolyzed double layered film was mounted in a chloralkali cell having an active area of 45 $cm^2$ between a dimensionally stable anode and a mild steel expanded metal cathode. The cell was operated at 80° C. with current of 3.1 KA/m². The anolyte salt content was held at 200 g/l. Water was added to the catholyte to maintain the concentration of caustic produced at 32±1%. After 5 days of operation, the cell was operating at 95.1% current efficiency and 3.68 volts. On the fifth day the membrane was subjected to a simulated failure of the brine feed. The brine was shut off to the cell while electrical power, water to the catholyte and temperature control were maintained. After 5 hours of continued operation, the anode chamber was half empty and the residual anolyte contained only 1–2% NaCl and the cell voltage had increased to 5.0 volts. The cell was then shut down, dissembled, and the membrane was inspected. The membrane was in perfect condition with no evidence of separation of the layers.

EXAMPLE 2

The extrusion conditions of Example 1 were repeated except that the speed of the first extruder was reduced to 10 rpm. A coextruded two-layered film was produced at the rate of 2.5 cm/sec (5 ft/min). The total thickness of the coextruded film varied from 100 to 152 microns.

A sample of this film was hydrolyzed and examined microscopically as in Example 1. The layer containing the carboxylic polymer was continuous across the width of the extruded film and its thickness averaged 9% of the total thickness of the film.

A sample of the hydrolyzed film was mounted in a laboratory cell with the side containing the carboxylic polymer toward the cathode. After 5 days of operation, it was performing at 94.9% current efficiency and 3.65 volts. The membrane was subject to a simulated failure of the brine feed as in Example 1. Upon inspection and examination, the membrane was in perfect condition with no evidence of blistering.

COMPARATIVE EXAMPLE A

A film was extruded fom the TFE/PSEPVE copolymer used in Example 1, except that the polymer had an equivalent weight of 1100 and gave a film with a thickness of 100 microns. A quantity of TFE/EVE copolymer of 1080 equivalent weight was extruded separately to yield a film of 50 micron thickness. A sample of each of these films was then pressed together to exclude air between the layers and thermally bonded by passing through a thermal laminator supported on a continuous web of a porous release paper through which vacuum was applied. The temperature of the laminator was controlled so that the temperature of the laminate reached 230°–235° C. at the end of the heated zone.

This thermally bonded double layer film was then hydrolyzed and tested in a laboratory cell as in Example 1. After a similar period of 5 days, the membrane was performing at 97.5% current efficiency and 3.61 volts, producing 32±1% NaOH. The cell was operated for a total of 12 days, at which time the membrane was subjected to a simulated failure of the brine feed system as in Example 1. Upon cell disassembly and inspection of the membrane, it was found to be extensively blistered. Approximately 75% of the area in the active area of the cell was covered with liquid-filled pockets or blisters. The separations had occurred at the interface of the TFE/PSEPVE and the TFE/EVE layers.

EXAMPLE 3

A portion of the double layered film from Example 1 in the unhydrolyzed state was laid on top of an open weave fabric prepared from monofilaments of a melt-extrudable perfluorocarbon resin (PFA). Below the cloth was placed a 50 micron film of TFE/PSEPVE copolymer of 1100 equivalent weight. This sandwich was then passed through a thermal laminator supported on a continous web of a porous release paper with vacuum. The temperature of the laminator was adjusted so that the temperature of the laminate reached 230°–235° C. at the end of the heated zone. The perfluorocarbon resin fabric was embedded or encapsulated in the TFE/PSEPVE copolymer. The laminate was hydrolyzed as in Example 1 and found to have greatly improved tear resistance over the unreinforced double layer films of Examples 1–2 and Comparative Example A.

A portion of this laminate was evaluated in a laboratory cell as in Example 1. After two days the performance was 95.2% current efficiency and 3.81 volts, operated at 80° C., 3.1 KA/m², 200 g/l NaCl in the anolyte and 32±1% NaOH. The anolyte concentration was then reduced to 115 g/l salt in the anolyte to simulate the partial stoppage of brine flow to the anolyte chamber. The cell was operated for an additional 26 days at this high salt depletion and then shut down and the membrane examined. No separation or blisters in the membrane were found.

EXAMPLE 4

A coextruded double layer film was prepared using the general procedure of Example 3, but with a different type of reinforcing cloth. The cloth consisted of a warp and fill of 20 threads per inch of a 200 denier polytetrafluoroethylene fiber and 40 threads per inch of a 50 denier rayon. In the lamination procedure, a 25 micron film of the 1100 equivalent weight TFE/PSEPVE copolymer was used below the cloth instead of the 50 micron film used in Example 3.

After hydrolysis the laminate was evaluated in a cell under the same conditions as Example 1. After 9 days its performance was 95.3% current efficiency and 3.69 volts. After 11 days the membrane was subjected to a stoppage of the brine feed as in Example 1. The cell was restarted and the laminate continued to perform at 95–96% current efficiency and 3.70 volts. After 30 days the cell was shut down and disassembled. Upon inspection, the membrane appeared to be in perfect condition with no blistering apparent.

COMPARATIVE EXAMPLE B

Separate films of 50 micron TFE/EVE and 100 micron TFE/PSEPVE wre pressed together as in Comparative Example A. This composite was then used to prepare a fabric-reinforced laminate as in Example 3. After hydrolysis the performance of the membrane was evaluated in a cell where after 5 days it was performing at 95% current efficiency and 3.9 volts under the conditions of Example 1. This membrane was subjected to a simulated failure of the brine feed system as in Example 1. Upon removal from the cell and inspection, the membrane was found to be extensively blistered with approximately 50% of the area in the active area of the cell covered with liquid-filled pockets or blisters.

In Examples 5–8, two component polymer structures were coated with a zirconium oxide dispersion. The dispersion contained 84.2% by weight of absolute ethanol, 2.6% by weight of TFE/PSEPVE, 13.2% by weight of zirconium dioxide having a particle size of from 5 to 9 microns, and a trace of Triton X-100 nonionic surfactant.

The laminar structure used in these examples as well as Comparative Example C was prepared by coextrusion according to the procedures of Example 1 and had an ester layer with a thickness of 38 microns and a sulfonyl layer having a thickness of 102 microns. After coextrusion, the membrane components were hydrolyzed to the potassium ionic form.

In these examples, the membranes were tested in a zero-gap cell and a finite-gap cell.

The zero-gap cell had a glass anode chamber and a plastic (polymethylmethacrylate) cathode chamber. The anode was ruthenium oxide/titanium oxide coated, expanded titanium mesh. The cathodic current collector was expanded nickel mesh. A 20 mesh platinized nickel hardware cloth was used as the cathode. The cell was assembled such that the sulfonic surface of the membrane and the anode were in contact, with the membrane and the platinized screen sandwiched tightly between the anode and the cathodic current collector.

The finite-gap cell used was similar to the zero-gap cell, except that the cathode was an expanded mild steel mesh and no platinized screen was used. The sulfonic surface of the membrane was kept in contact with the anode by maintaining a differential hydraulic pressure between the anode and cathode chambers. A three millimeter gap was maintained between the cathode and the membrane.

Comparative Example C

Samples of the laminar membrane were tested in zero-gap and finite-gap cells operated at 32% NaOH and 200 g/l NaCl. The cells were evaluated for current efficiency and cell voltage at a current density of 3.1 KA/m$^2$, and the results are summarized below:

| Cell | Current Efficiency | Cell Voltage |
| --- | --- | --- |
| Zero gap | 96.5 | 3.50 |
| Finite gap | 96.5 | 3.45 |

EXAMPLE 5

A sample of the laminar membrane was spray coated on both carboxyl (cathodic) and sulfonic (anodic) surfaces with the zirconium dioxide dispersion. Pieces from this membrane were run in both zero gap cells and finite gap cells at 32% NaOH, 220 g/l NaCl, and 3.1 KA/m$^2$ current density. The cells were evaluated, and the results summarized below.

| Cell | Current Efficiency | Cell Voltage |
| --- | --- | --- |
| Zero gap | 97.4 | 2.98 |
| Finite gap | 94.5 | 3.34 |

EXAMPLE 6

The anode (sulfonic) surface of samples of the laminar membrane was roughened such that the average roughness is 3.2 microns (125 microinches) as measured by a Bendix Model 1020 profilometer. The carboxylic (cathodic) surface was spray coated with the zirconium dioxide dispersion. Five pieces of this membrane were run in zero gap cells. The average cell performance was 97.3% caustic current efficiency and 3.05 volts at 3.1 KA/m$^2$ current density.

EXAMPLE 7

A dispersion was prepared in the same manner as above except nickel oxide was used as the inorganic surface modifying agent instead of zirconium dioxide. This dispersion was coated onto the cathodic (carboxyl) surface of the laminar membrane. The anodic (sulfonic) surface of the membrane was roughened as in Example 5.

The roughened membrane was placed into a zero gap cell, and tested at 90° C., 32% NaOH, 200 g/l exit brine. The average performance was 94.8% current efficiency and 3.01 cell voltage at 3.1 KA/m$^2$ current density.

EXAMPLE 8

A reinforced membrane was made from the laminar membrane. Unhydrolyzed laminar membrane was placed on top of a reinforcing fabric prepared from PTFE and polyester threads. Below the cloth was placed 1 mil (25 microns) of TFE/PSEPVE copolymer having an equivalent weight of 1100. This sandwich of materials was passed through a thermal laminator. The laminate was then hydrolyzed and coated on the cathodic (carboxyl) side with the ZrO$_2$ dispersion described above.

The membrane was then placed into the finite gap cell and tested at 90° C., 32% NaOH and 200 g/l exit brine, and 3.1 KA/m$^2$ current density. The cell voltage was 3.52 V. When the cathode was moved against the membrane (providing a zero gap cell) the voltage decreased to 3.48.

We claim:

1. A process for the preparation of a multilayer cationic ion exchange membrane by heating at least two substantially incompatible melt-fabricable fluorinated polymers containing pendant side chains having functional groups selected from sulfonyl and carboxyl to a temperature above the melting point of the polymers, bringing the molten polymers into contact while each is at a temperature above the melting point of the polymer, coextruding the polymers into a composite film, cooling the resulting composite to a temperature below the melting points of each of the films, and subsequently converting the functional groups to ionizable functional groups.

2. A process of claim 1 wherein two polymers are extruded.

3. A process of claim 2 wherein one polymer contains sulfonyl functional groups and the other polymer contains carboxylic functional groups.

4. A process of claim 2 wherein both polymers contain sulfonyl functional groups and differ in equivalent weight by at least 200.

5. A process of claim 1 wherein the extrusion temperature is maintained at about from 260 to 330° C.

6. A process of claim 1 wherein the multilayer membrane is extruded to a total thickness of about from 25 to 250 microns.

7. A process of claim 6 wherein the multilayer membrane is extruded to a thickness of about from 75 to 150 microns.

8. A process of claim 1 wherein the composite is laminated to a reinforcing web prior to converting the functional groups to ionizable functional groups.

9. A coextruded cation exchange membrane resulting from the process of claim 1.

10. A coextruded cation exchange membrane resulting from the process of claim 8.

11. In a process for the continuous production of alkali metal hydroxide which comprises continuously providing an aqueous alkali metal halide solution to the anode compartment of an electrolytic cell having an anode, a cathode, and a cation exchange membrane separating the anode and the cathode; electrolyzing the solution; and continuously removing alkali metal hydroxide solution, hydrogen, and halogen from the electrolytic cell, the improvement wherein the exchange membrane consists essentially of a coextruded cation exchange membrane resulting from the process of claim 1.

12. In an electrolytic cell having an anode, a cathode, and a cation exchange membrane separating the anode and the cathode, the improvement wherein the cation exchange membrane consists essentially of a coextruded cation exchange membrane resulting from the process of claim 1.

13. An electrolytic cell of claim 12 wherein the gap between the anode and the cathode is no greater than about 3 mm.

14. An electrolytic cell of claim 13 wherein the cation exchange membrane is in contact with at least one of the anode and cathode.

15. A process of claim 1 further comprising applying to at least one surface of the multilayered cationic ion exchange membrane a gas- and liquid-permeable porous layer of electrocatalyst composition.

16. A process of claim 1 further comprising applying to at least one surface of the multilayered cationic ion exchange membrane a gas- and liquid-permeable porous non-electrode layer.

17. A process of claim 1 further comprising applying to at least one surface of the resulting multilayered cationic ion exchange membrane at least one gas- and liquid-permeable porous layer selected from electrocatalyst composition and non-electrode material.

18. A process of claim 1 further comprising embossing at least one surface of the resulting multilayered cationic ion exchange membrane to provide a surface roughness of about 2–5 microns.

19. A process of claim 16 wherein the gas and liquid permeable porous non-electrode layer is applied as a dispersion of inorganic compound in a binder.

20. A process of claim 19 wherein the binder is a fluorocarbon polymer.

21. A process of claim 20 wherein the inorganic component is selected from the group consisting of tin oxide, titanium oxide, zirconium oxide, nickel oxide and iron oxide.

22. A process of claim 21 wherein the inorganic component consists essentially of zirconium oxide.

23. A process of claim 20 wherein at least the surface of the fluorocarbon polymer is hydrophilic.

* * * * *